United States Patent
Takaki et al.

(10) Patent No.: US 9,051,490 B2
(45) Date of Patent: Jun. 9, 2015

(54) METHOD FOR PRODUCING HOLLOW SILICONE FINE PARTICLES

(75) Inventors: Akira Takaki, Osaka (JP); Takamitsu Amano, Osaka (JP); Ryutarou Mukai, Osaka (JP)

(73) Assignee: KANEKA CORPORATION, Osaka-shi (JP)

( * ) Notice: Subject to any disclaimer, the term of this patent is extended or adjusted under 35 U.S.C. 154(b) by 1184 days.

(21) Appl. No.: 12/281,138

(22) PCT Filed: Feb. 20, 2007

(86) PCT No.: PCT/JP2007/053048
§ 371 (c)(1),
(2), (4) Date: Aug. 28, 2008

(87) PCT Pub. No.: WO2007/099814
PCT Pub. Date: Sep. 7, 2007

(65) Prior Publication Data
US 2009/0004418 A1    Jan. 1, 2009

(30) Foreign Application Priority Data

Mar. 2, 2006 (JP) ................. 2006-056999
Oct. 5, 2006 (JP) ................. 2006-273776

(51) Int. Cl.
  *B29C 59/00*    (2006.01)
  *C09D 183/04*   (2006.01)
  *B01J 13/18*    (2006.01)

(52) U.S. Cl.
  CPC ......... *C09D 183/04* (2013.01); *Y10T 428/1397* (2015.01); *B01J 13/18* (2013.01)

(58) Field of Classification Search
  CPC ....... C08J 7/047; B29C 47/021; A61K 8/585; A61K 8/11; A61K 2800/412; C08K 7/26; C08K 3/36
  USPC ............ 264/129, 131, 134, 632, 267, 7, 135, 264/170, 171.12, 171.26; 427/204
  See application file for complete search history.

(56) References Cited

U.S. PATENT DOCUMENTS 4,370,160 A    1/1983  Ziemelis
4,935,464 A *  6/1990  Ona et al. ............... 524/837
(Continued)

FOREIGN PATENT DOCUMENTS

CN    1557862 A    12/2004
EP    429222    *  8/1990
(Continued)

OTHER PUBLICATIONS

International Preliminary Report on Patentability, mailed Sep. 12, 2008, directed to counterpart International Patent Application No. PCT/JP2007/053048; 5 pages.
(Continued)

*Primary Examiner* — Stella Yi
(74) *Attorney, Agent, or Firm* — Morrison & Foerster LLP (57) ABSTRACT

Hollow silicone fine particles have high productivity, low breakability, a narrow particle size distribution and a volume average particle diameter equal to or lower than 1 μm. The hollow particles are made by removing organic macromolecular particles and/or an organic solvent away form inside core-shell particles produced by coating particles made from the organic macromolecular particles and/or the organic solvent with silicone compound that is made from one or more units selected from the group consisting of $SiO_{4/2}$ unit, $RSiO_{3/2}$ unit, and $R_2SiO_{2/2}$ unit (wherein R is C1-4 alkyl groups, C6-24 aromatic groups, a vinyl group, a γ-(meth) acryloxypropyl group or organic groups having an SH group(s)), the silicone compound containing $R_2SiO_{2/2}$ unit by 20 mole % or less.

2 Claims, 1 Drawing Sheet

(56) References Cited

U.S. PATENT DOCUMENTS

| | | | |
|---|---|---|---|
| 5,945,043 A | 8/1999 | Hamada et al. | |
| 6,180,236 B1 | 1/2001 | Hamada et al. | |
| 6,221,326 B1 | 4/2001 | Amiche | |
| 6,337,089 B1 * | 1/2002 | Yoshioka et al. | 424/451 |
| 2005/0124761 A1 * | 6/2005 | Schultes et al. | 525/100 |
| 2007/0036705 A1 * | 2/2007 | Butts et al. | 423/335 |
| 2007/0251422 A1 | 11/2007 | Maenaka et al. | |

FOREIGN PATENT DOCUMENTS

| | | |
|---|---|---|
| JP | 63-85701 | 4/1988 |
| JP | 63-258642 | 10/1988 |
| JP | 6-330606 | 11/1994 |
| JP | 7-133105 | 5/1995 |
| JP | 11-29318 | 2/1999 |
| JP | 2000-191789 A | 7/2000 |
| JP | 2001-233611 A | 8/2001 |
| JP | 2003-128788 A | 5/2003 |
| JP | 2003-171465 A | 6/2003 |
| JP | 2009-173802 | 8/2009 |
| WO | WO-2007-017843 A2 | 2/2007 |
| WO | WO-2007/021508 A2 | 2/2007 |

OTHER PUBLICATIONS

International Search Report, mailed May 15, 2007, directed to counterpart International Patent Application No. PCT/JP2007/053048; 2 pages.

Notice of Allowance dated May 20, 2014 directed towards counterpart JP Application No. 2008-502714; 2 pages.

* cited by examiner

METHOD FOR PRODUCING HOLLOW SILICONE FINE PARTICLES

REFERENCE TO RELATED APPLICATIONS

This application is a national stage application under 35 USC 371 of International Application No. PCT/JP2007/053048, filed Feb. 20, 2007, which claims the priorities of Japanese Patent Application Nos. 2006-056999, filed Mar. 2, 2006 and 2006-273776, filed Oct. 5, 2006, the contents of which prior applications are incorporated herein by reference.

FIELD OF THE INVENTION

The present invention relates to a method for producing hollow silicone fine particles having a volume average particle diameter of 0.001 µm to 1 µm. Further, the present invention relates to: the hollow silicone fine particles produced with the method; a film-coated substrate on a surface of which a coating film made from the hollow silicone fine particles and a film-forming matrix is formed; and a method for producing the film-coated substrate.

BACKGROUND OF THE INVENTION

There has been known that when, to an outermost layer of a transparent substrate, a low refractive index layer (a reflection-reducing layer) that is made from a material having a lower refractive index than the substrate is formed in a quarter thickness (approximately 100 nm) of a visible wavelength, there is a reduction in surface reflectance. An antireflection transparent substrate made of a film or glass to which this principle is applied has been in widespread use in a variety of fields, such as electronic products, optical products, building materials, and the like.

As a method for forming the reflection-reducing layer, a dry coating method with which magnesium fluoride or the like, is vapor-deposited or sputtered, and a wet coating method with which a solution of a low refractive index material is applied to a substrate have been known. Of the methods, the wet coating method has attracted attention recently, because it has little restrictions as to substrates it can adopt, and is advantageous in continuous production and costs over the other.

As the low refractive index material for the wet coating method, a material made from a combination of fluorine resin, porous silica, or hollow silica, and a film-forming matrix has been known (See Japanese Unexamined Patent Publication Nos. 85701/1988 (Tokukaisyo 63-85701) and 2001-233611 (Tokukai 2001-233611)).

Hollow silica having a particle diameter of approximately 0.1 µm to 300 µm, and a method for producing the hollow silica have been well known already (See Japanese Unexamined Patent Publication Nos. 258642/1988 (Tokukaisyo 63-258642) and 330606/1994 (Tokukaihei 6-330606)). Japanese Unexamined Patent Publication No. 330606/1994 (Tokukaihei 6-330606) discloses a technique with which (1) an organic solvent is added to and mixed with an inorganic material, such as a silicate, so as to make an oil-in-water (O/W) type emulsion; and then, (2) an organic solvent containing a lipophilic surfactant is added to and mixed with the emulsion so as to make an oil-in-water-in-oil (O/W/O) type emulsion, and finally, (3) an inorganic compound are turned into a water-insoluble deposit by use of an inorganic acid or an ammonium salt of the inorganic acid, so that inorganic hollow fine particles are obtained. Since the technique was disclosed, other various methods for producing the hollow silica particles still have been disclosed (See Japanese Unexamined Patent Publication Nos. 133105/1995 (Tokukaihei 7-133105), 2001-233611 (Tokukai 2001-233611), 29318/1999 (Tokukaihei 11-29318) and Japanese translation of PCT international publication No. 500113/2000 (Tokuhyo 2000-500113)).

Japanese Unexamined Patent Publication No. 133105/1995 (Tokukaihei 7-133105) discloses a method with which (1) a silicate of alkali metal, for example, and an alkali-soluble inorganic compound are turned into colloid particles by use of an alkaline solution having a pH of 10 or over, and then (2) elements of this particle, except silicone and oxygen, is partially removed, after that, (3) this particle is coated with a hydrolysable organosilicon compound or the like. Japanese Unexamined Patent Publication No. 29318/1999 (Tokukaihei 11-29318) discloses a method with which a tetraalkoxysilane that is solubilized in water is emulsified in an organic solvent by use of a surfactant, so that a hydrolysis and a condensation reaction occur. In this case, when a moisture content is high, micron-size hollow silica particles are produced. Further, Japanese translation of PCT international publication No. 500113/2000 (Tokuhyo 2000-500113) discloses a method for obtaining the hollow silica by: depositing activated silica from alkaline silicate metal on a core made from a material other than silica; and removing the core.

However, these techniques have a lot of problems, such as: a problem that the hollow silica easily breaks in a process due to a large number of pores in a silica layer or a thin thickness of the silica layer; a low porosity caused by significant remains of nuclear particles in hollows; limited usage resulting from the fact that the conventional methods can only realize the micron-size hollow silica having a wide particle size distribution; and low productivity due to a long reaction period and a large number of steps.

SUMMARY OF INVENTION

An object of the present invention is to provide: a method for producing hollow silicone fine particles having high productivity, low breakability, a narrow particle size distribution and a volume average particle diameter equal to or lower than 1 µm; and the hollow silicone fine particles produced with the method. Further, an object of the present invention is to provide a transparent film-coated substrate that is coated with a film so as to have low reflectivity and high film intensity, the film made from the hollow silicone fine particles and a film-forming matrix, the hollow silicone fine particles having a high porosity, a low refraction index, high productivity, low breakability, the narrow particle size distribution and the volume average particle diameter equal to or lower than 1 µm.

In view of the object described above, as a result of diligent study, the inventors of the present invention found that the desired hollow silicone fine particles can be produced by removing particles made from organic macromolecular (polymer) particles and/or an organic solvent away from inside core-shell particles that are produced by coating the particles made from the organic macromolecular particles and/or the organic solvent with a certain silicone compound, and further that a film made from the hollow silicone fine particles and a film-forming matrix makes it possible to produce the desired transparent film-coated substrate having low reflectivity and high film intensity. Based on the finding, the inventors of the present invention accomplished the present invention.

That is, the present invention relates to a method for producing hollow silicone fine particles having a volume average particle diameter of 0.001 μm to 1 μm, including the step of removing particles (X) away from inside core-shell particles (D), the particles (X) made from organic macromolecular particles (A) and/or an organic solvent (B), the core-shell particles (D) produced by coating the particles (X) with a silicone compound (C) that is made from one or more units selected from the group consisting of $SiO_{4/2}$ unit, $RSiO_{3/2}$ unit (wherein R is at least one selected from the group consisting of $C_{1-4}$ alkyl groups, $C_{6-24}$ aromatic groups, a vinyl group, a γ-(meth)acryloxypropyl group and organic groups having an SH group(s)), and $R_2SiO_{2/2}$ unit (wherein R is at least one selected from the group consisting of $C_{1-4}$ alkyl groups, $C_{6-24}$ aromatic groups, a vinyl group, a γ-(meth)acryloxypropyl group, and organic groups having an SH group(s)), the silicone compound (C) containing the $R_2SiO_{2/2}$ unit by 20 mole % or less.

A preferable embodiment relates to the method for producing the hollow silicone fine particles, wherein a weight ratio of the particles (X) made from the organic macromolecular particles (A) and/or the organic solvent (B) to the silicone compound (C) is in a range of 2:98 to 95:5.

Further, the preferable embodiment relates to any of the aforementioned methods for producing the hollow silicone fine particles, wherein the particles (X) made from the organic macromolecular particles (A) and/or the organic solvent (B) are removed away from inside the core-shell particles (D) by use of an organic solvent.

The preferable embodiment relates to any of the aforementioned methods for producing the hollow silicone fine particles, wherein the silicone compound (C) contains $RSiO_{3/2}$ unit by 50 mole % or more.

The present invention relates to hollow silicone fine particles produced with any of the aforementioned producing methods.

The present invention relates to a method for producing a film-coated substrate, the method including the following steps (a) to (c).
(a) A step for producing core-shell particles (D) by coating particles (X) made from organic macromolecular particles (A) and/or the organic solvent (B) with a silicone compound (C) that is made from one or more units selected from the group consisting of $SiO_{4/2}$ unit, $RSiO_{3/2}$ unit (wherein R is at least one selected from the group consisting of $C_{1-4}$ alkyl groups, $C_{6-24}$ aromatic groups, a vinyl group, a γ-(meth)acryloxypropyl group, and organic groups having an SH group(s)), and $R_2SiO_{2/2}$ unit (wherein R is at least one selected from the group consisting of $C_{1-4}$ alkyl groups, $C_{6-24}$ aromatic groups, a vinyl group, a γ-(meth)acryloxypropyl group, and organic groups having an SH group(s)), the silicone compound (C) containing $R_2SiO_{2/2}$ unit by 20 mole % or less, and $RSiO_{3/2}$ unit by 50 mole % or more.
(b) A step for producing hollow silicone fine particles (E) having a volume average particle diameter of 0.001 μm to 1 μm, by removing the particles (X) made from the organic macromolecular particles (A) and/or the organic solvent (B) away from inside the core-shell particles (D).
(c) A step for forming a film (F) containing the hollow silicone fine particles (E) and a film-forming matrix, on a surface of a substrate either solely or together with another film.

The preferable embodiment relates to the method for producing the film-coated substrate, wherein a weight ratio of the particles (X) made from the organic macromolecular particles (A) and/or the organic solvent (B) to the silicone compound (C) is in a range from 2:98 to 95:5.

The preferable embodiment relates to any of the aforementioned methods for producing the film-coated substrate, wherein the particles (X) made from the organic macromolecular particles (A) and/or the organic solvent (B) are removed away from inside the core-shell particles (D) by use of an organic solvent.

Further, the present invention relates to a film-coated substrate having, on a surface thereof, a film (F) containing hollow silicone fine particles (E) having a volume average particle diameter of 0.001 μm to 1 μm, and a film-forming matrix, either solely or together with another films, the hollow silicone fine particle (E) having a periphery portion made from a silicone compound (C) that is made from one or more units selected from the group consisting of $SiO_{4/2}$ unit, $RSiO_{3/2}$ unit (wherein R is at least one selected from the group consisting of $C_{1-4}$ alkyl groups, $C_{6-24}$ aromatic groups, a vinyl group, a γ-(meth)acryloxypropyl group, and organic groups having an SH group(s)), and $R_2SiO_{2/2}$ unit (wherein R is at least one selected from the group consisting of $C_{1-4}$ alkyl groups, $C_{6-24}$ aromatic groups, a vinyl group, a γ-(meth)acryloxypropyl group, and organic groups having an SH group(s)), the silicone compound (C) containing $R_2SiO_{2/2}$ unit by 20 mole % or less, and $RSiO_{3/2}$ unit by 50 mole % or more.

The preferable embodiment relates to the film-coated substrate, wherein the hollow silicone fine particle (E) are obtained by removing particles made from organic macromolecular particles (A) and/or organic solvent (B) away from inside core-shell particles (D) produced by coating particles (X) made from the organic macromolecular particles (A) and/or the organic solvent (B) with the silicone compound (C).

With the method according to the present invention, for producing the hollow silicone fine particles, it is possible to provide the hollow silicone fine particles having high productivity, low breakability, a narrow particle size distribution, and a volume average particle diameter equal to or lower than 1 μm. Because the hollow silicone fine particles according to the present invention has the high porosity, the low refraction index, the high productivity, low breakability, the narrow particle size distribution, and the volume average particle diameter equal to or lower than 1 μm, by forming the film made from the fine particles and the film-forming matrix on the surface of the substrate, it is possible to provide the transparent film-coated substrate stably having low reflectivity and high film intensity.

DETAILED DESCRIPTION OF THE INVENTION

The present invention provides a method for producing hollow silicone fine particles having a volume average particle diameter of 0.001 μm to 1 μm, the method including the step of removing particles (X) away from inside core-shell particles (D), the particles (X) made from organic macromolecular particles (A) and/or an organic solvent (B), the core-shell particles (D) produced by coating the particles (X) with a silicone compound (C) that is made from one or more units selected from the group consisting of $SiO_{4/2}$ unit, $RSiO_{3/2}$ unit (wherein R is at least one selected from the group consisting of $C_{1-4}$ alkyl groups, $C_{6-24}$ aromatic groups, a vinyl group, a γ-(meth)acryloxypropyl group, and organic groups having an SH group(s)), and $R_2SiO_{2/2}$ unit (wherein R is at least one selected from the group consisting of $C_{1-4}$ alkyl groups, $C_{6-24}$ aromatic groups, a vinyl group, a γ-(meth)acryloxypropyl group, and organic groups having an SH group(s)), the silicone compound (C) containing the $R_2SiO_{2/2}$ unit by 20 mole % or less. Furthermore, the present invention provides the hollow silicone fine particles produced with the method.

Further, the present invention provides a method for producing a film-coated substrate, the method including the steps of: (a) producing the core-shell particles (D) by coating the particles (X) made from the organic macromolecular particles (A) and/or the organic solvent (B) with the silicone compound (C) that is made from one or more units selected from the group consisting of $SiO_{4/2}$ unit, $RSiO_{3/2}$ unit, and $R_2SiO_{2/2}$ unit, the silicone compound (C) containing $R_2SiO_{2/2}$ unit by 20 mole % or less, and $RSiO_{3/2}$ unit by 50 mole % or more; (b) producing hollow silicone fine particles (E) having a volume average particle diameter of 0.001 μm to 1 μm, by removing the particles (X) made from the organic macromolecular particles (A) and/or the organic solvent (B) away from inside the core-shell particles (D); and (c) forming a film (F) containing the hollow silicone fine particles (E) and a film-forming matrix, on a surface of a substrate either solely or together with another film.

Furthermore, the present invention provides the film-coated substrate having the film (F) on a surface thereof either solely or together with another film, the film (F) containing the hollow silicone fine particles (E) and a film-forming matrix, the hollow silicone fine particles (E) having a periphery portion made from the silicone compound (C) that is made from one or more units selected from the group consisting of $SiO_{4/2}$ unit, $RSiO_{3/2}$ unit, and $R_2SiO_{2/2}$ unit, the silicone compound (C) containing $R_2SiO_{2/2}$ unit by 20 mole % or less, and $RSiO_{3/2}$ unit by 50 mole % or more.

The organic macromolecular particles (A) of the present invention is not particularly limited in terms of composition. A soft polymer represented by, for example, poly butyl acrylate, polybutadiene, and a butyl acrylate-butadiene copolymer, or a hard polymer, such as a butyl acrylate-styrene copolymer, a butyl acrylate-acrylonitrile copolymer, and a butyl acrylate-styrene-acrylonitrile copolymer, and styrene-acrylonitrile copolymer, may be suitably used as the organic macromolecular particles (A). In view of a removablity that is to be needed in a later stage in the process, the soft polymer is preferable.

A polymer having butyl acrylate by 50 wt % or more is more preferable, and particularly, poly butyl acrylate as a matter of course, the butyl acrylate-butadiene copolymer, the butyl acrylate-styrene copolymer, the butyl acrylate-acrylonitrile copolymer, and the butyl acrylate-styrene-acrylonitrile copolymer are preferable. A polymer having poly butyl acrylate by 80 wt % or more is further more preferable, and particularly, the polymers listed above are preferable. Among the polymers, poly butyl acrylate is the most preferable.

The organic macromolecular particles (A) of the present invention may be produced in any way and may be produced by a well-known method, such as an emulsion polymerization method, a microsuspension polymerization method, a miniemulsion polymerization method, and an aqueous dispersion method. Among them, the emulsion polymerization method is particularly preferable in view of easiness in control of a particle diameter, and suitability for industrial production.

For the polymerization of the organic macromolecular particles (A), a radical polymerization initiator may be used. Specifically, examples of the radical polymerization initiator encompass: organic peroxides such as cumene hydroperoxide, t-butyl hydroperoxide, benzoyl peroxide, t-butyl peroxy isopropyl carbonate, and paramenthane hydroperoxide; inorganic peroxides such as potassium persulfate, and ammonium persulfate; and azo compounds such as 2,2'-azobisisobutyronitrile, and 2,2'-azobis-2,4-dimethylvaleronitrile. The aforementioned polymerization can be efficiently carried out even at a low polymerization temperature, for example, with the use of a redox type initiator, such as ferrous sulfate-sodium formaldehyde sulfoxylate-ethylenediamine tetra acetic acid·2Na salt, ferrous sulfate-glucose-sodium pyrophosphate, and ferrous sulfate-sodium pyrophosphate-sodium phosphate.

In consideration of a case where the organic macromolecular particles (A) are removed by use of the organic solvent in a later stage in the process, the organic macromolecular particles (A) of the present invention are preferably non-crosslinking macromolecules, and low in molecular weight. Specifically, the organic macromolecular particles (A) preferably have a weight average molecular weight of lower than 30000, more preferably, lower than 10000. In order to attain a low weight average molecular weight of the organic macromolecular particles (A), for example, it is possible to arbitrarily select a combination of various means, such as use of a chain transfer agent, a setting of a high polymerization temperature, and use of a large amount of an initiator.

A lower limit of the weight average molecular weight of the organic macromolecular particles (A) is not particularly limited. However, in consideration of difficulty of synthesis, the limit may be approximately 2000. The weight average molecular weight can be measured, for example, by an analysis (in terms of polystyrene) by gel permeation chromatography (GPC).

In the present invention, it is possible to use a seed polymerization method in order to narrow the particle size distribution of the organic macromolecular particles (A). In consideration of uniformity in a refractive index of the hollow silicone fine particles, the organic macromolecular particles (A) preferably have a narrow particle size distribution. The volume average particle diameters of the organic macromolecular particles (A) and the core-shell particles (D), both of which are in a form of latex, can be determined with a light scattering method, or by an electron microscope observation. The volume average particle diameter and the particle size distribution can be measured with the use of MICROTRAC UPA manufactured by LEED & NORTHRUP INSTRUMENTS Co, for example.

The organic solvent (B) of the present invention is not limited as long as it is insoluble in water, and can form fine particles by use of an emulsifier. The organic solvent (B) may be, but not limited to, toluene, benzene, xylene, and n-hexane, for example.

In the present invention, the particles (X) made from the organic macromolecular particles (A) and/or the organic solvent (B) may be used as cores in producing the core-shell particles (D). With the present invention, because the organic macromolecular particles (A) and/or the organic solvent (B) is removed ultimately, it is preferable to use the organic solvent (B) in addition to the organic macromolecular particles (A) so as to realize easiness in the removal. However, it is possible to use only one of them. In a case where both the organic macromolecular particles (A) and the organic solvent (B) are used to produce the particles, a ratio of the organic macromolecular particles (A) to the organic solvent (B) is preferably in a range of 100:0 to 1:99.

The silicone compound (C), which is to be a coating portion of the core-shell particles (D) of the present invention, is made from one or more units selected from the group consisting of $SiO_{4/2}$ unit, $RSiO_{3/2}$ unit, and $R_2SiO_{2/2}$ unit, and contains $R_2SiO_{2/2}$ unit by 20 mole % or less.

For example, $SiO_{4/2}$ unit may be formed from one or more selected from the group consisting of silicon tetrachloride, tetraalkoxysilanes, liquid glass, and metal silicate. As the tetraalkoxysilanes, specifically, tetramethoxysilane, tetraethoxysilane, tetrapropoxysilane, and condensation products of them may be used, for example.

In the formula of $RSiO_{3/2}$ unit, R is at least one selected from the group consisting of $C_{1-4}$ alkyl groups, $C_{6-24}$ aromatic groups, vinyl groups, γ-(meth)acryloxypropyl groups, and organic groups having SH group(s). Depending on a substrate, a small amount of a vinyl group, a γ-(meth)acryloxypropyl group, or organic groups having SH group(s), and a large amount of an alkyl group(s) or an aromatic group(s) may be selected for the R. For example, $RSiO_{3/2}$ unit may be formed from one or more of methyltrimethoxysilane, methyltriethoxysilane, methyltripropoxysilane, ethyltrimethoxysilane, ethyltriethoxysilane, ethyltripropoxysilane, phenyltrimethoxysilane, phenyltriethoxysilane, phenyltripropoxysilne, γ-mercaptopropyl trimethoxysilane, γ-methacryloxypropyl trimethoxysilane, and vinyltrimethoxysilane.

$R_2SiO_{2/2}$ unit (R may be selected from the same group as in the case of $RSiO_{3/2}$ unit), may be formed from, for example, a cyclic compound, such as dimethyldimethoxysilane, diphenyldimethoxysilane, methylphenyldimethoxysilane, dimethyldiethoxysilane, diphenyldiethoxysilane, methylphenyldiethoxysilane, diethyldimethoxysilane, ethylphenyldimethoxysilane, diethyldiethoxysilane, ethylphenyldiethoxysilane, hexamethylcyclotrisiloxane (D3), octamethylcyclotetrasiloxane (D4), decamethylcyclopentasiloxane (D5), dodecamethylcyclohexasiloxane (D6), and trimethyltriphenylcyclotrisiloxane, a straight or branched organosiloxane, γ-mercaptopropylmethyldimethoxysilane, γ-methacryloxypropylmethyldimethoxysilane, vinylmethyldimethoxysilane, or the like.

With the present invention, in a case where it is desired that the hollow silicone fine particles have flexibility, it is possible to mix a small amount of $R_2SiO_{2/2}$ unit with another unit. The silicone compound (C) of the core-shell particles (D) contains $R_2SiO_{2/2}$ unit by 20 mole % or less. More preferably, the silicone compound (C) contains $R_2SiO_{2/2}$ unit by 10 mole % or less. If the silicone compound (C) contains $R_2SiO_{2/2}$ unit by 20 mole % or more, the hollow silicone fine particles may ultimately become too flexible, and have a trouble in shape retention. A lower limit of an $R_2SiO_{2/2}$ unit proportion in the silicone compound (C) is 0 mole %.

Further, the silicone compound (C) according to the method of the present invention contains $RSiO_{3/2}$ unit by 50 mole % or more, that is to say, from 50 mole % to 100 mole %. In consideration of stability in the particle size distribution of the core-shell particles, a range from 75 mole % to 100 mole %, particularly from 85 mole % to 100 mole %, is more preferable. In view of the shape retention of the hollow silicone fine particles, the silicone compound (C) preferably contains $SiO_{4/2}$ unit by 0 mole % to 80 mole %, more preferably 0 mole % to 50 mole %, particularly 0 mole % to 10 mole %. If the silicone compound (C) contains $SiO_{4/2}$ unit by more than 50 mole %, and the hollow silicone fine particles are used in the film-coated substrate, the fine particles may cohere in the film because of a reduction in compatibility between the particles and the film-forming matrix, and transmittance of the film-coated substrate may be significantly reduced.

With the present invention, a weight ratio of the particles (X) made from the organic macromolecular particles (A) and/or the organic solvent (B) to the silicone compound (C) is preferably, but not limited to, in a range from 2:98 to 95:5, more preferably 4:96 to 55:45. If the ratio is lower than 2:98, the porosity of the hollow silicone fine particles may ultimately become too low. On the contrary, if the ratio is higher than 95:5, the hollow silicone fine particles may break in the process due to lack of intensity thereof.

The volume average particle diameters of the core-shell particles (D) and the hollow silicone fine particles (E) range preferably from 0.001 μm to 1 μm, more preferably from 0.002 μm to 0.6 μm. It is possible to produce the particles of less than 0.001 μm, or more than 1 μm, but it is generally difficult to realize stable synthesis. Further, the particles of less than 0.001 μm, or more than 1 μm tend to reduce the transmittance of the film-coated substrate.

The particle size distribution of the core-shell particles (D) of the present invention is not particularly limited. However, in consideration of uniformity in the refractive index of the hollow silicone particles, the organic macromolecular particles (A) preferably has a narrow particle size distribution.

With the present invention, for example, the core-shell particles (D) coated with the silicone compound (C) can be obtained by, to water at a temperature of 5 C.° to 120 C.°, containing: the organic macromolecular particles (A) and/or the organic solvent (B); and an acid catalyst, adding an emulsified liquid at one time or continuously, which emulsified liquid produced by, with the use of a line mixer or a homogenizer, emulsifying a mixture of: an emulsifier; the raw material of $R_2SiO_{2/2}$ unit, $RSiO_{3/2}$ unit, and $SiO_{4/2}$ unit; and water. It does not matter whether the emulsified liquid is added at one time or continuously. However, it takes longer than the other though, for stability of the particles in the form of the latex, and the particle size distribution, the way of adding continuously is preferably adopted. Immediately after adding the acid catalyst, by adding the emulsified liquid continuously under a condition where a hydrolysis and a condensation reaction immediately occur, it becomes possible to make the core-shell particles significantly grow with time, and have the narrow particle size distribution as in usual seed polymerization. In a case where the adding is carried out continuously for a relatively short period of 30 minutes to one hour, it also becomes possible to have both relatively high productivity, and the narrow particle size distribution.

An anionic emulsifier or a nonionic emulsifier may be preferably used as the emulsifier of the present invention. For example, sodium alkylbenzene sulfonate, sodium lauryl sulfonate, or potassium oleate, especially sodium dodecylbenzene sulfonate, may be suitably used as the anionic emulsifier. As the nonionic emulsifier, polyoxyethylene nonylphenyl ether, or polyoxyethylene lauryl ether may be used, for example.

Examples of the acid catalyst that can be used in the present invention encompass sulfonic acids such as aliphatic sulfonic acid, aliphatic substituted benzenesulfonic acid, and aliphatic substituted naphthalenesulfonic acid, and mineral acids such as vitriolic acid, hydrochloric acid, and nitric acid. Among these, in view of superiority in emulsion stability of organosiloxane, the aliphatic substituted benzenesulfonic acid, particularly n-dodecylbenzenesulfonic acid, is especially preferable.

Heating for a reaction for producing the core-shell particles (D) is preferably at a temperature in a range of 5 C.° to 120 C.°, more preferably 20 C.° to 80 C.°.

In the present invention, a method for removing the particles (X) made from the organic macromolecular particles (A) and/or the organic solvent (B) may be, for example, a method employing the organic solvent, or a method employing combustion. The organic solvent for removing the particles (X) made from the organic macromolecular particles (A) and/or the organic solvent (B) away from inside the core-shell particles (D) is preferably an organic solvent not dissolving the silicone compound (C) that is to be the shells, but dissolving the particles (X) made from the organic macromolecular particles (A) and/or the organic solvent (B), which particles (X) will be the cores. Examples of the organic solvent are toluene, benzene, xylene, and n-hexane.

Moreover, with the present invention, it is possible to further wash the silicone fine particles after the cores are removed away. Specifically, the organic solvent that can be used in the washing may be methanol, n-hexane, or the like. By making use of a hollow structure, the hollow silicone fine particles of the present invention can be for use in realizing a low refractive index, a low-dielectric constant, an extended-release, and the like. Specifically, the hollow silicone fine particles are suitably used as a material of a reflection-reducing layer of an antireflection transparent substrate, for example.

The hollow silicone fine particles of the present invention have a relatively large porosity compared with conventional hollow silica, so that only in a small amount, the hollow silicone fine particles can reduce reflectivity. For this reason, it is possible to obtain the film-coated substrate having low reflectivity without a reduction in film intensity. In order to form the film (F) made from the hollow silicone fine particles (E) and the film-forming matrix on the substrate, it is preferable that the hollow silicone fine particles (E) are dispersed in a solvent that is compatible to the film-forming matrix, in which solvent the hollow silicone fine particles (E) disperse easily and finely. Water, methanol, ethanol, propanol, ethylene glycol, or the like may be used as the solvent. By mixing the hollow silicone particles (E), a dispersion liquid of the solvent, and the film-forming matrix, and by employing a method, such as a coating method, a spinner method, a dip method, a spray method, or the like, it is possible to form a film having an uniform thickness. As the film-forming matrix, coating resin, such as acryl resin, urethane resin, polyester resin, melamine resin, and silicone resin, and a hydrolyzable organosilicone compound, such as alkoxysilane, may be used. A weight ratio of the hollow silicone fine particles to the film-forming matrix in the film is preferably in a range of 99:1 to 1:99, more preferably 45:55 to 5:95. If the ratio is higher than 99:1, and the hollow silicone fine particles increase, the film intensity will tend to decrease. If the ratio is lower than 1:99, and the hollow silicone fine particles decrease, flexibility of the film cannot be reduced, and a reflection-reducing effect will tend to decrease.

The film (F) can be formed on the substrate either directly or indirectly, and also either solely or together with another film. The other film may be, for example, an under coating film or a primer film formed between the film (F) and the substrate, a protection film formed on the film (F), a hard coating film, a flattening film, a high refractive index film, an insulating film, a conductive resin film, a conductive metal fine particle film, or a conductive metal oxide fine particle film.

The substrate of the present invention may be made from plastic, such as a polyethylene terephthalate (PET), polycarbonate, and acrylic, or glass, for example. The substrate may have any shape, such as a film shape and a lens shape.

EXAMPLE

The following specifically explains the present invention on the basis of examples, however, the present invention is not limited to this. Measurement and tests in the following examples and comparative examples were carried out as described below.
(Volume Average Particle Diameter)
Volume average particle diameters of organic macromolecular particles and core-shell particles were measured in the form of latex. The volume average particle diameter (μm) was determined with the use of MICROTRAC UPA (manufactured by LEED & NORTHRUP INSTRUMENTS Co.), as a measurement device, by a light scattering method.
(Weight Average Molecular Weight of Organic Macromolecules)
A weight average molecular weight of organic macromolecules was determined by a conversion of a calibration curve of a polystyrene standard sample, which calibration curve was obtained by a GPC measurement.
(Confirmation of Core-Shell Particles)
Core-shell particles in the form of latex were checked (in some particles, cores may divide into a plurality of cores) such that after being dissolved in epoxy resin, and cured, the latex was stained with ruthenium, and observed under a TEM. An example where core-shell structures were confirmed was evaluated as "good", and an example where core-shell structures could not be confirmed was evaluated as "bad".
(Confirmation of Hollow Silicone Fine Particles in Film)
Confirmation whether hollow silicone particles existed in a film was carried out such that the film was stained with ruthenium, and observed under a TEM.
(Confirmation of Removal of Organic Macromolecules and the Like Away from Core-Shell Particles)
Confirmation on removal of cores was carried out such that cured core-shell particles were added with n-hexane that was 5 times more than latex in amount, and then twice serially: mixed; agitated; left at rest; and sorted out, after that, an amount of poly butyl acrylate in a transparent supernatant solution was found. An example where the removal of the cores was confirmed was evaluated as "good", and an example where the removal of the cores could not be confirmed was evaluated as "bad".
(Measurement of Reflectivity)
Reflectivity of a PET film whose surface opposite to a coating surface was rubbed against sandpaper, and painted over with black paint, was measured with the use of a spectrophotometer (a V-560 UV-VIS Spectrophotometer equipped with an integrating sphere attachment ISV-469, manufactured by JASCO Co.), and then, a minimum value in a visual light region was determined.
(Measurement of Light Transmittance)
Light transmittance was measured with the use of a haze meter (NDH-300A manufactured by Nippon Densyoku Industries Co., Ltd.).
(Measurement of Adherence)
A surface of a film-coated substrate was scratched with a knife so that 11 parallel lines were made with intervals of 1 mm, and 100 squares were made. Then, Scotch tape was attached to this. By peeling the Scotch tape off, adherence was measured in terms of the number of the squares where the film remained. A film having a large number of the squares where the film was remained is considered a film having high film intensity. An evaluation is based on the following standard.
A: A substrate having the film-remained squares of 95 to 100
B: A substrate having the film-remained squares of 90 to 94
C: A substrate having the film-remained squares of 0 to 89

Examples 1 to 4, 7 to 9, and Comparative Example 1

Water of 400 parts by weight (hereinafter, referred to as "pts.wt.") (a total amount including various dilution water), and sodium dodecylbenzene sulfonate (SDBS) of 1 pts.wt. (of a solid content) were mixed in a five-neck flask having a stirrer, a reflux condenser, an orifice for blowing nitrogen, an orifice for adding a monomer, and a thermometer, and then heated to a temperature of 50 C.°. After being heated to a temperature of 50 C.°, a headspace of the mixed liquid was replaced with nitrogen. After that, a mixed liquid of butyl acrylate of 10 pts.wt., t-dodecyl mercaptan of 3 pts.wt., and a paramenthane hydroperoxide of 0.01 pts.wt. was added. Thirty minutes later, ferrous sulfate ($FeSO_4 \cdot 7H_2O$) of 0.002 pts.wt., ethylenediamine tetraacetic acid·2Na salt of 0.005 pts.wt., and sodium formaldehyde sulfoxylate of 0.2 pts.wt. were added, and the mixed liquid was further polymerized for one hour.

Then, a mixed liquid of butyl acrylate of 90 pts.wt., t-dodecyl mercaptan of 27 pts.wt., and paramenthane hydroperoxide of 0.1 pts.wt. was continuously added for three hours. Two hours later, polymerization was carried out, whereby latex of organic macromolecules (P-1) was obtained. The organic macromolecules had a volume average particle diameter of 0.14 μm, and a weight average molecule weight of 6000.

Water of 500 pts.wt. (a total amount including various dilution water), and dodecylbenzene sulfonic acid (DBSA) of 3 pts.wt., the organic macromolecules (P-1), and toluene (TL) that was emulsified in water containing SDBS by 0.5 wt % (the amounts of which P-1 and TL are showed in Table 1), the water having the same amount of toluene, were mixed in a five-neck flask having a stirrer, a reflux condenser, an orifice for blowing nitrogen, an orifice for adding a monomer, and a thermometer. At this point, the mixed liquid had a pH of 1.8. The mixed liquid was heated to a temperature of 80 C.°, and a headspace of the mixed liquid was replaced with nitrogen. After that, separately, a mixture of pure water of 100 pts.wt., SDBS (of a solid content) of 0.5 pts.wt., ethyl silicate 40 (manufactured by TAMA CHEMICALS Co., LTD.) (of approximately equal to pentamer of tetraethoxysilane), methyltrimethoxysilane (MTMS), octamethylcyclotetrasiloxane (D4) (amounts of which ethyl silicate 40, MTMS, and D4 are showed in Table 1), was agitated by a homogenizer by 700 rpm for 5 minutes, so that an emulsified liquid was obtained. The emulsified liquid was added with an adding technique showed in Table 1.

In the case of being added at one time, all the emulsified liquid was added within 5 minutes, and in the case of being added continuously, the emulsified liquid was added at a fixed velocity for 30 minutes. After the adding, agitation was taken place for 5 hours. Then, the mixture was cooled down to a temperature of 25 C.°, and left at rest for 20 hours, after that, the core-shell particles in the form of the latex were obtained. The core-shell particles, and the volume average particle diameter thereof were checked, and Table 1 shows the result.

Next, to the latex of the core-shell particles, a calcium chlorite solution of 5 pts.wt. (of a solid content), having a solid content concentration by 5 wt %, was added, so that a solidification slurry was obtained. The solidification slurry was neutralized to a pH of 7 by a 2.5 wt % NaOH solution, and then, added with n-hexane of 500 pts.wt., and, mixed, agitated, and filtered. Further, once again, the solidification slurry was added with n-hexane of 500 pts.wt., and mixed, agitated, and filtered. Removal of the organic macromolecules and toluene from the core-shell particles was checked, and Table 1 shows the result.

Examples 5 and 6

Water of 400 pts.wt. (a total amount including various dilution water), and sodium dodecylbenzene sulfonate (SDBS) of 0.2 pts.wt. (of a solid content) were mixed in a five-neck flask having a stirrer, a reflux condenser, an orifice for blowing nitrogen, an orifice for adding a monomer, and a thermometer, and then the mixed liquid was heated to a temperature of 50 C.°. After being heated to a temperature of 50 C.°, a headspace of the mixed liquid was replaced with nitrogen. Then, a mixed liquid of butyl acrylate of 10 pts.wt., t-dodecyl mercaptan of 3 pts.wt., and paramenthane hydroperoxide of 0.01 pts.wt. was added. Thirty minutes later, ferrous sulfate ($FeSO_4 \cdot 7H_2O$) of 0.002 pts.wt., ethylenediamine tetraacetic acid·2Na salt of 0.005 pts.wt., and sodium formaldehyde sulfoxylate of 0.2 pts.wt. were added, and the mixed liquid was further polymerized for one hour.

After that, a mixed liquid of butyl acrylate of 90 pts.wt., t-dodecyl mercaptan of 27 pts.wt., and paramenthane hydroperoxide of 0.1 pts.wt. was continuously added for 3 hours. In the adding, SDBS of 0.1 pts.wt. (of a solid content) was added three times hourly (1, 2, and 3 hours later from the beginning of the adding). Two hours later, polymerization was carried out, whereby latex of organic macromolecules (P-2) was obtained. The organic macromolecules had the volume average particle diameter of 0.08 μm, and a weight average molecular weight of 5000.

Water of 500 pts.wt. (a total amount including various dilution water), dodecylbenzene sulfonic acid (DBSA) of 3 pts.wt., and the organic macromolecules (P-2) (of a solid content), an amount of which is showed in Table 1, were mixed in a five-neck flask having a stirrer, a reflux condenser, an orifice for blowing nitrogen, an orifice for adding the monomer, and a thermometer, and then heated to a temperature of 80 C.°, and a headspace of the mixed liquid was replaced with nitrogen. After that, separately, a mixture of pure water of 100 pts.wt., SDBS of 0.5 pts.wt. (of a solid content), and methyltrimethoxysilane (MTMS), an amount of which is showed in Table 1, was agitated by a homogenizer by 7000 rpm for 5 minutes, so that an emulsified liquid was obtained. The emulsified liquid was added continuously for 3 hours. After the adding, agitation was taken place for 3 hours. Then, the mixture was cooled down to a temperature of 25 C.°, and left at rest for 20 hours, after that, the core-shell particles in the form of the latex were obtained. The core-shell particles, and the volume average particle diameter thereof were checked, and Table 1 shows the result.

Next, to the latex of the core-shell particles, a calcium chlorite solution of 5 pts.wt. (of a solid content), having a solid content concentration of 5 wt % was added, so that a solidification slurry was obtained. The solidification slurry was neutralized to a pH of 7 by a 2.5 wt % NaOH solution, and added with n-hexane of 500 pts.wt., and then, mixed, agitated, and filtered. Further, once again, the solidification slurry was added with n-hexane of 500 pts.wt., and mixed, agitated, and filtered. Removal of the organic macromolecules from the core-shell particles was checked, and Table 1 shows the result.

TABLE 1

|  |  | EXAMPLES ||||||
|---|---|---|---|---|---|---|---|
|  |  | EXAMPLE 1 | EXAMPLE 2 | EXAMPLE 3 | EXAMPLE 4 | EXAMPLE 5 | EXAMPLE 6 |
| CONDITIONS | ORGANIC MACROMOLECULES/ TL (pts.wt.) | P-1(5) | P-1(25) | P-1(50) | P-1(25) | P-2(25) | P-2(5) |
|  | SILICATE40/ MTMS/D4 (pts.wt.) | 0/95/0 | 0/75/0 | 0/50/0 | 0/75/0 | 0/75/0 | 0/95/0 |
|  | WAY OF ADDING EMULSIFIED LIQUID | AT ONE TIME | AT ONE TIME | AT ONE TIME | CONTIN-UOUSLY | CONTIN-UOUSLY | CONTIN-UOUSLY |
| FEATURES OF PARTICLES | CORE-SHELL PARTICLES VOLUME AVERAGE PARTICLE DIAMETER (μm) | 0.23 | 0.11 | 0.10 | 0.12 | 0.25 | 0.52 |
|  | CORE-SHELL STRUCTURE | GOOD | GOOD | GOOD | GOOD | GOOD | GOOD |
|  | REMOVAL OF ORGANIC MACROMOLECULES FROM CORE-SHELL PARTICLES | GOOD | GOOD | GOOD | GOOD | GOOD | GOOD |

|  |  | EXAMPLES ||| COMPARATIVE EXAMPLE |
|---|---|---|---|---|---|
|  |  | EXAMPLE 7 | EXAMPLE 8 | EXAMPLE 9 | COMPARATIVE EXAMPLE 1 |
| CONDITIONS | ORGANIC MACROMOLECULES/ TL (pts.wt.) | P-1(25) | P-1(25) | P-1(12.5)/ TL(12.5) | P-1(0) |
|  | SILICATE40/ MTMS/D4 (pts.wt.) | 0/71.25/3.75 | 18.75/56.25/0 | 0/75/0 | 0/100/0 |
|  | WAY OF ADDING EMULSIFIED LIQUID | AT ONE TIME | CONTIN-UOUSLY | CONTIN-UOUSLY | AT ONE TIME |
| FEATURES OF PARTICLES | CORE-SHELL PARTICLES VOLUME AVERAGE PARTICLE DIAMETER (μm) | 0.12 | 0.12 | 0.15 | 0.22 |
|  | CORE-SHELL STRUCTURE | GOOD | GOOD | GOOD | BAD |
|  | REMOVAL OF ORGANIC MACROMOLECULES FROM CORE-SHELL PARTICLES | GOOD | GOOD | GOOD | BAD |

TL: TOLUENE,
D4: OCTAMETHYLCYCLOTETRASILOXANE,
MTMS: METHYLTRIMETHOXYSILANE,
GOOD: CONFIRMED,
BAD: NOT CONFIRMED

Hollow silicone fine particles having the volume average particle diameter of 0.001 μm to 1 μm were obtained by removing the organic macromolecules away from inside the core-shell particles produced by coating particles made from organic macromolecular particles and/or an organic solvent with a silicone compound made from one or more units selected form the group consisting of $RsiO_{4/2}$ unit, $RsiO_{3/2}$ unit, and $R_2SiO_{2/2}$.

Example 10

Water of 400 pts.wt. (a total amount including various dilution water), and sodium dodecylbenzene sulfonate (SDBS) of 2 pts.wt. (of a solid content) were mixed in a five-neck flask having a stirrer, a reflux condenser, an orifice for blowing nitrogen, an orifice for adding a monomer, and a thermometer, and then the mixed liquid was heated to a temperature of 50 C.°. After the mixed liquid was heated to a temperature of 50 C.°, a headspace of the mixed liquid was replaced with nitrogen. After that, a mixed liquid of butyl acrylate of 10 pts.wt., t-dodecyl mercaptan of 3 pts.wt., and paramenthane hydroperoxide of 0.01 pts.wt. was added. Thirty minutes later, ferrous sulfate ($FeSO_4 \cdot 7H_2O$) of 0.002 pts.wt., ethylenediamine tetraacetic acid·2Na salt of 0.005 pts.wt., and sodium formaldehyde sulfoxylate of 0.2 pts.wt.

were added to the mixed liquid. The mixed liquid was further polymerized for one hour.

Then, a mixed liquid of butyl acrylate of 90 pts.wt., t-dodecyl mercaptan of 27 pts.wt., and paramenthane hydroperoxide of 0.1 pts.wt. was continuously added for 3 hours. Two hours later, polymerization was carried out, whereby latex of organic macromolecules (P-3) was obtained. The organic macromolecules had a volume average particle diameter of 0.1 μm, and a weight average molecular weight of 6000.

Water of 500 pts.wt. (a total amount including various dilution water), dodecylbenzene sulfonic acid (DBSA) of 3 pts.wt., the organic macromolecules (P-3) of 25 pts.wt (of a solid content) were mixed in a five-neck flask having a stirrer, a reflux condenser, an orifice for blowing nitrogen, an orifice for adding a monomer, and a thermometer. At this point, the mixed liquid had a pH of 1.8. The mixed liquid was heated to a temperature of 80 C.°, and a headspace of the mixed liquid was replaced with nitrogen. After that, separately, a mixture of pure water of 100 pts.wt., SDBS of 0.5 pts.wt. (of a solid content), ethyl silicate 40 (manufactured by TAMA CHEMICALS Co., LTD.) (of approximately equal to pentamer of tetraethoxysilane), methyltrimethoxysilane (MTMS), amounts of which ethyl silicate 40 and MTMS are showed in Table 2, was added at a fixed velocity for 30 minutes.

Figure 1:
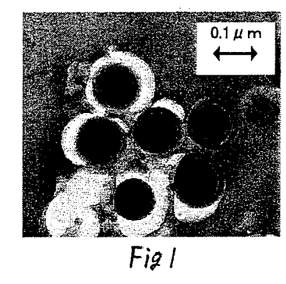
FIG. 1 is a photograph showing a result of a TEM observation of core-shell particles whose cores had not been removed yet.

After the adding, agitation was taken place for 5 hours. Then, the mixed liquid was cooled down to a temperature of 25 C.°, and left at rest for 20 hours. Finally, the core-shell particles in the form of the latex were obtained. The core-shell particles, and the volume average particle diameter thereof were checked, and Table 2 shows the result. Further, FIG. 1 shows the result of a TEM observation of the core-shell particles in the form of the latex. Around cores of poly butyl acrylate that is stained with ruthenium, shells of silicone can be seen.

Next, to the latex of the core-shell particles, a calcium chlorite solution of 5 pts.wt. (of a solid content), having a solid content concentration of 5 wt %, was added, so that a solidification slurry was obtained. The solidification slurry was neutralized to a pH of 7 by a 2.5 wt % NaOH solution, and then, added with n-hexane of 500 pts.wt., and mixed, agitated, and filtered. Removal of the organic macromolecules from the core-shell particles was checked, and Table 2 shows the result.

The filtered particles were added to a combined solvent of 300 pts.wt., which combined solvent was made of methanol of 70 wt %, and hexane of 30 wt %, and then, mixed, agitated, and filtered. These filtered particles were dispersed in propanol, and a dispersion liquid having a particle concentration of 5 wt % was obtained. This dispersion liquid and an acrylic resin solution (which was a film-forming matrix) of 5 wt % were mixed so that a particle weight in a film was adjusted to a value showed in Table 2.

Figure 2:
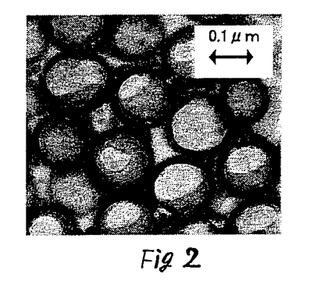
FIG. 2 is a photograph showing a result of the TEM observation of hollow silicone fine particles in a film.

A PET film was coated with this film liquid with a bar-coater method, and then, dried at 110 C.° for 20 minutes. As a result, a film-coated substrate having a film that had a thickness of 0.1 μm to 0.2 μm was obtained. FIG. 2 shows the result of a TEM observation of the film that was stained by ruthenium. In this case, the hollow silicone fine particles were also seen.

Reflectivity of the film-coated substrate was measured, and a minimum reflectivity in a visual light region was determined. Further, Table 2 shows evaluation results of light transmittance and adherence of the substrate.

Examples 11 to 17, and Comparative Example 3

Water of 400 pts.wt. (a total amount including various dilution water), and sodium dodecylbenzene sulfonate (SDBS) of 12 pts.wt. (of a solid content) were mixed in a five-neck flask having a stirrer, a reflux condenser, an orifice for blowing nitrogen, an orifice for adding a monomer, and a thermometer, and heated to a temperature of 50 C.°. After the mixed liquid was heated to a temperature of 50 C.°, a headspace of the mixed liquid was replaced with nitrogen. After that, a mixed liquid of butyl acrylate of 10 pts.wt., t-dodecyl mercaptan of 3 pts.wt., and paramenthane hydroperoxide of 0.01 pts.wt. was added. Thirty minutes later, ferrous sulfate ($FeSO_4 \cdot 7H_2O$) of 0.002 pts.wt., ethylenediamine tetraacetic acid·2Na salt of 0.005 pts.wt., and sodium formaldehyde sulfoxylate of 0.2 pts.wt. were added, and the mixed liquid was further polymerized for one hour.

Then, a mixed liquid of butyl acrylate of 90 pts.wt., t-dodecyl mercaptan of 27 pts.wt., and paramenthane hydroperoxide of 0.1 pts.wt. was continuously added for 3 hours. Two hours later, polymerization was carried out, whereby latex of organic macromolecules (P-4) was obtained. The organic macromolecules had a volume average particle diameter of 0.015 μm, and a weight average molecular weight of 6000.

Water of 500 pts.wt. (a total amount including various dilution water), dodecylbenzene sulfonic acid (DBSA) of 3 pts.wt., the organic macromolecules (P-4), an amount of which is showed in Table 1, were mixed in a five-neck flask having a stirrer, a reflux condenser, an orifice for blowing nitrogen, an orifice for adding a monomer, and a thermometer. At this point, the mixed liquid had a pH of 1.8. The mixed liquid was heated to a temperature of 80 C.°, and a headspace of the mixed liquid was replaced with nitrogen. After that, separately, a mixture of pure water of 100 pts.wt., SDBS (of a solid content) of 0.5 pts.wt., ethyl silicate 40 (manufactured by TAMA CHEMICALS Co., LTD.) (of approximately equal to pentamer of tetraethoxysilane), methyltrimethoxysilane (MTMS), amounts of which ethyl silicate 40, and MTMS are showed in Table 1, was added at a fixed velocity for 30 minutes.

After the adding, an agitation was taken place for 5 hours. Then, the mixed liquid was cooled down to a temperature of 25 C.°, and left at rest for 20 hours, so that core-shell particles in the form of the latex were obtained. The core-shell particles and the volume average particle diameter thereof were checked, and Table 2 shows the result.

Next, to the latex of the core-shell particles, a calcium chlorite solution of 5 pts.wt. (of a solid content), having a solid content concentration of 5 wt %, was added, so that a solidification slurry was obtained. The solidification slurry was neutralized to a pH of 7 by a 2.5 wt % NaOH solution, and then, added with n-hexane of 500 pts.wt., and mixed, agitated, and filtered. Removal of the organic macromolecules was checked, and Table 2 shows the result.

The filtered particles were added to a combined solvent of 300 pts.wt., which combined solvent was made of methanol of 70 wt %, and hexane of 30 wt %, and then, mixed, agitated, and filtered. These filtered particles were dispersed in propanol, and a dispersion liquid having a particle concentration of 5 wt % was obtained. This dispersion liquid and an acrylic resin solution (which was a film-forming matrix) of 5 wt % were mixed so that a particle weight in the film was adjusted to a value showed in Table 2.

A PET film was coated with this film liquid with a bar-coater method, and then, dried at 80 C.° for 20 minutes. As a result, a film-coated substrate having a film that had a thickness of 0.1 μm to 0.2 cm was obtained.

Reflectivity of the film-coated substrate was measured, and a minimum reflectivity in a visual light region was determined. Further, Table 2 shows evaluation results of light transmittance and adherence of the substrate.

Comparative Example 2

Evaluation results of a PET film having no coating are showed in Table 2.

TABLE 2

|  |  | EXAMPLES | | | | | |
|---|---|---|---|---|---|---|---|
|  |  | EXAMPLE 10 | EXAMPLE 11 | EXAMPLE 12 | EXAMPLE 13 | EXAMPLE 14 | EXAMPLE 15 |
| FINE PARTICLES | ORGANIC MACROMOLECULES (pts.wt) | P-3(25) | P-4(25) | P-4(25) | P-4(25) | P-4(25) | P-4(12.5) |
|  | MTMS/ SILICATE 40 (pts.wt.) | 75/0 | 75/0 | 75/0 | 75/0 | 75/0 | 87.5/0 |
|  | CORE-SHELL PARTICLES VOLUME AVERAGE PARTICLE DIAMETER ($\mu$m) | 0.13 | 0.02 | 0.02 | 0.02 | 0.02 | 0.02 |
|  | CORE-SHELL STRUCTURE | GOOD | GOOD | GOOD | GOOD | GOOD | GOOD |
|  | REMOVAL OF ORGANIC MACROMOLECULES FROM CORE-SHELL PARTICLES | GOOD | GOOD | GOOD | GOOD | GOOD | GOOD |
| FILM-COATED SUBSTREATE | PARTICLE WEIGHT IN FILM (WT %) | 33 | 14 | 25 | 33 | 50 | 33 |
|  | REFLECTIVITY (%) | 0.9 | 1.3 | 0.9 | 0.7 | 0.5 | 1.0 |
|  | ADHERENCE | A | A | A | A | B | A |
|  | LIGHT TRANSMITANCE(%) | 92.0 | 92.5 | 92.5 | 93.0 | 94.0 | 92.5 |

|  |  | EXAMPLES | | COMPARATIVE EXAMPLE | |
|---|---|---|---|---|---|
|  |  | EXAMPLE 16 | EXAMPLE 17 | COMPARATIVE EXAMPLE 2 | COMPARATIVE EXAMPLE 3 |
| FINE PARTICLES | ORGANIC MACROMOLECULES (pts.wt) | P-4(50) | P-4(25) |  | P-4(25) |
|  | MTMS/ SILICATE 40 (pts.wt.) | 50/0 | 70/5 |  | 40/60 |
|  | CORE-SHELL PARTICLES VOLUME AVERAGE PARTICLE DIAMETER ($\mu$m) | 0.02 | 0.02 |  | 0.02 |
|  | CORE-SHELL STRUCTURE | GOOD | GOOD |  | GOOD |
|  | REMOVAL OF ORGANIC MACROMOLECULES FROM CORE-SHELL PARTICLES | GOOD | GOOD |  | GOOD |
| FILM-COATED SUBSTREATE | PARTICLE WEIGHT IN FILM (WT %) | 33 | 33 | 0 | 33 |
|  | REFLECTIVITY (%) | 0.5 | 0.7 | 6.0 | 10 OR OVER |
|  | ADHERENCE | A | A | — | C |
|  | LIGHT TRANSMITANCE(%) | 93.5 | 92.5 | 89.5 | 55.0 |

MTMS: METHYLTRIMETHOXYSILANE
GOOD: CONFIRMED
BAD: NOT CONFIRMED
A: FILM-REMAINED SQUARES OF 95-100,
B: FILM-REMAINED SQUARES OF 90-94,
C: FILM-REMAINED SQUARES OF 0-89

The PET film showed low reflectivity and high adherence, which PET film has the film containing the hollow silicone fine particles having the volume average particle diameter of 0.001 µm to 1 µm, and the film-forming matrix, the hollow silicone fine particles produced by removing the organic macromolecules away from inside the core-shell particles produced by coating particles made from organic macromolecular particles with a silicone compound made from $RSiO_{4/2}$ unit, $SiO_{3/2}$ unit, and $R_2SiO_{2/2}$ unit.

The invention claimed is:

1. A method for producing hollow silicone fine particles having a volume average particle diameter of 0.001 µm to 1 µm, comprising:

producing core-shell particles (D) by coating particles (X) with a silicone compound (C), the particles (X) being made from organic macromolecular particles (A) and/or an organic solvent (B), and the silicone compound (C) containing (i) $SiO_{4/2}$ unit by 0 mole % to 50 mole % relative to the total silicone compound (C), (ii) $R_2SiO_{2/2}$ unit (wherein R is at least one selected from the group consisting of $C_{1-4}$ alkyl groups, $C_{6-24}$ aromatics groups, a vinyl group, a γ-(meth) acryloxypropyl group and organic groups having an SH group(s)) by 0 mole % to 10 mole % relative to the total silicone compound (C), and (iii) $RSiO_{3/2}$ unit (wherein R is at least one selected from the group consisting of $C_{1-4}$ alkyl groups, $C_{6-24}$ aromatic groups, a vinyl group, a γ-(meth) acryloxypropyl group and organic groups having an SH group(s)) by 50 mole % to 100 mole % relative to the total silicone compound (C);

removing the particles (X) away from inside the core-shell particles (D) by use of an organic solvent and wherein a weight ratio of the particles (X) made from the organic macromolecular particles (A) and/or organic solvent (B) to the silicone compound (C) is in a range of 2:98 to 95:5.

2. The method according to claim 1, wherein the silicone compound (C) contains the (ii) $R_2SiO_{2/2}$ unit by 0 mol % to 2.36 mol %.

* * * * *